Dec. 4, 1934.  J. V. ROGERS  1,983,403
METHOD AND APPARATUS FOR TREATING FRUITS AND VEGETABLES
Original Filed Feb. 23, 1928   3 Sheets-Sheet 1
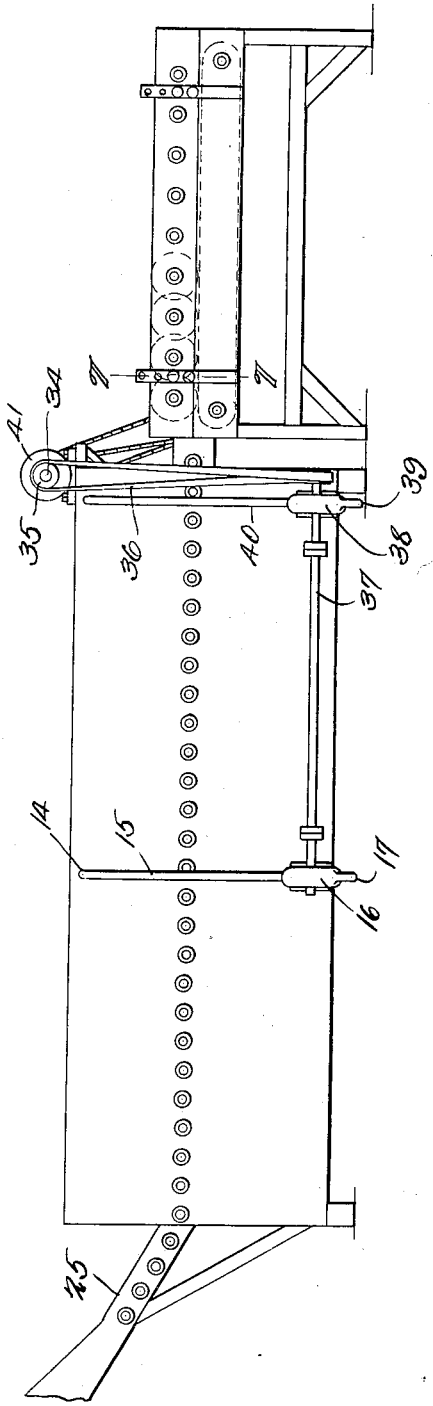
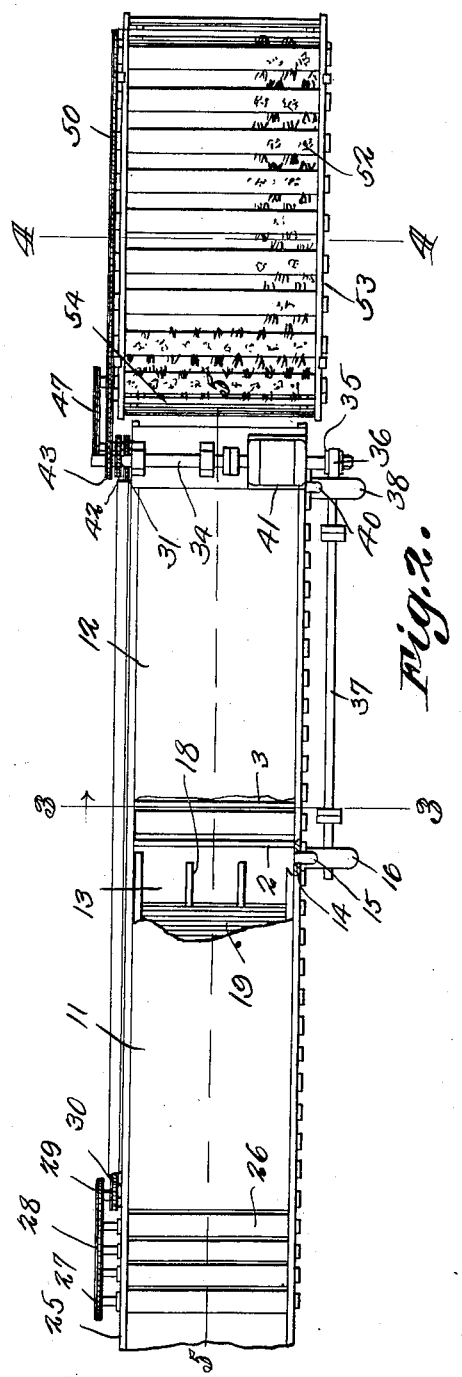
Jabin V. Rogers, Inventor
By C. A. Snow & Co., Attorneys Dec. 4, 1934. J. V. ROGERS 1,983,403
METHOD AND APPARATUS FOR TREATING FRUITS AND VEGETABLES
Original Filed Feb. 23, 1928  3 Sheets-Sheet 2
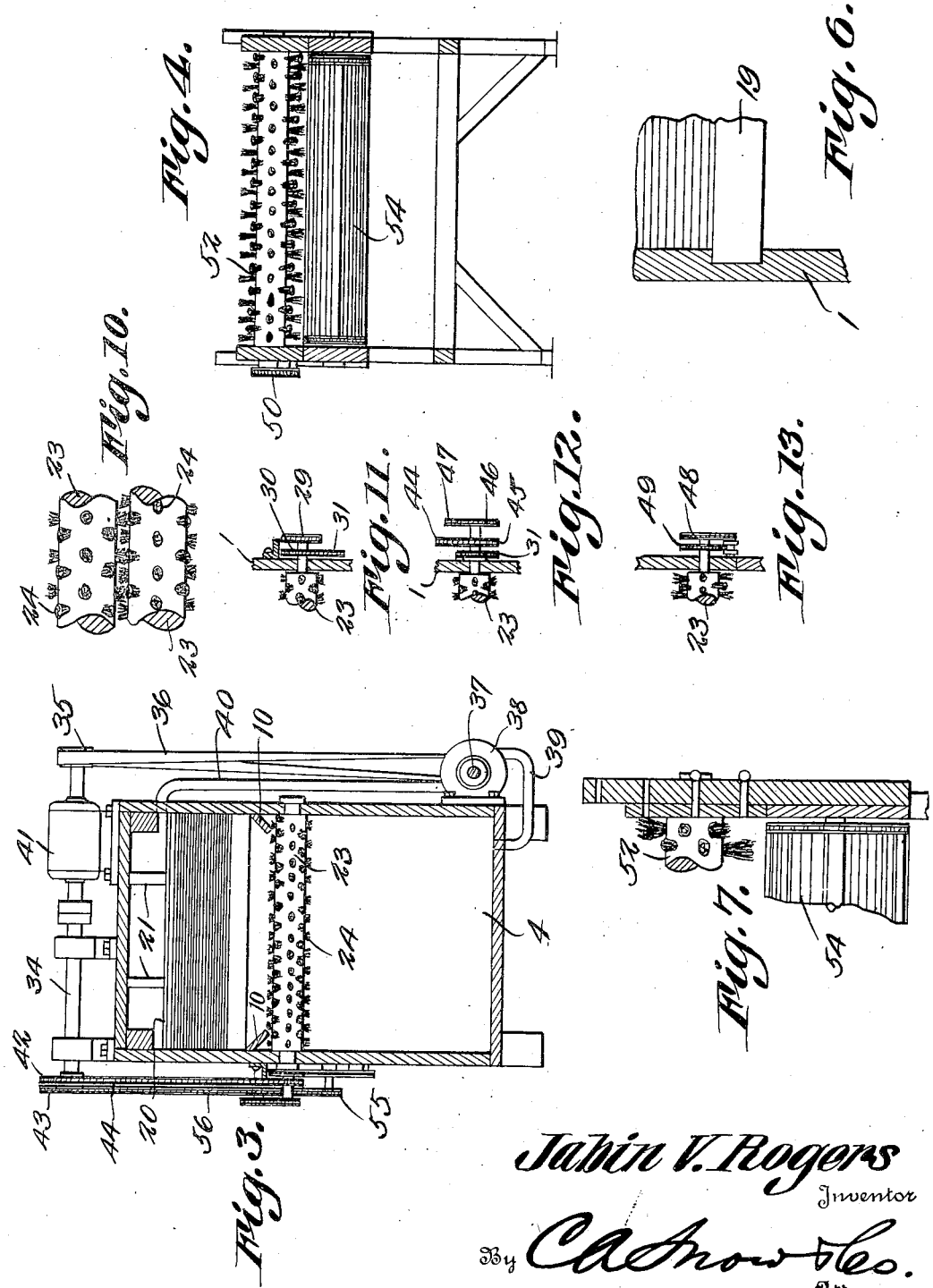
Jabin V. Rogers
Inventor
By C. A. Snow & Co.
Attorneys.

Dec. 4, 1934.  J. V. ROGERS  1,983,403
METHOD AND APPARATUS FOR TREATING FRUITS AND VEGETABLES
Original Filed Feb. 23, 1928  3 Sheets-Sheet 3
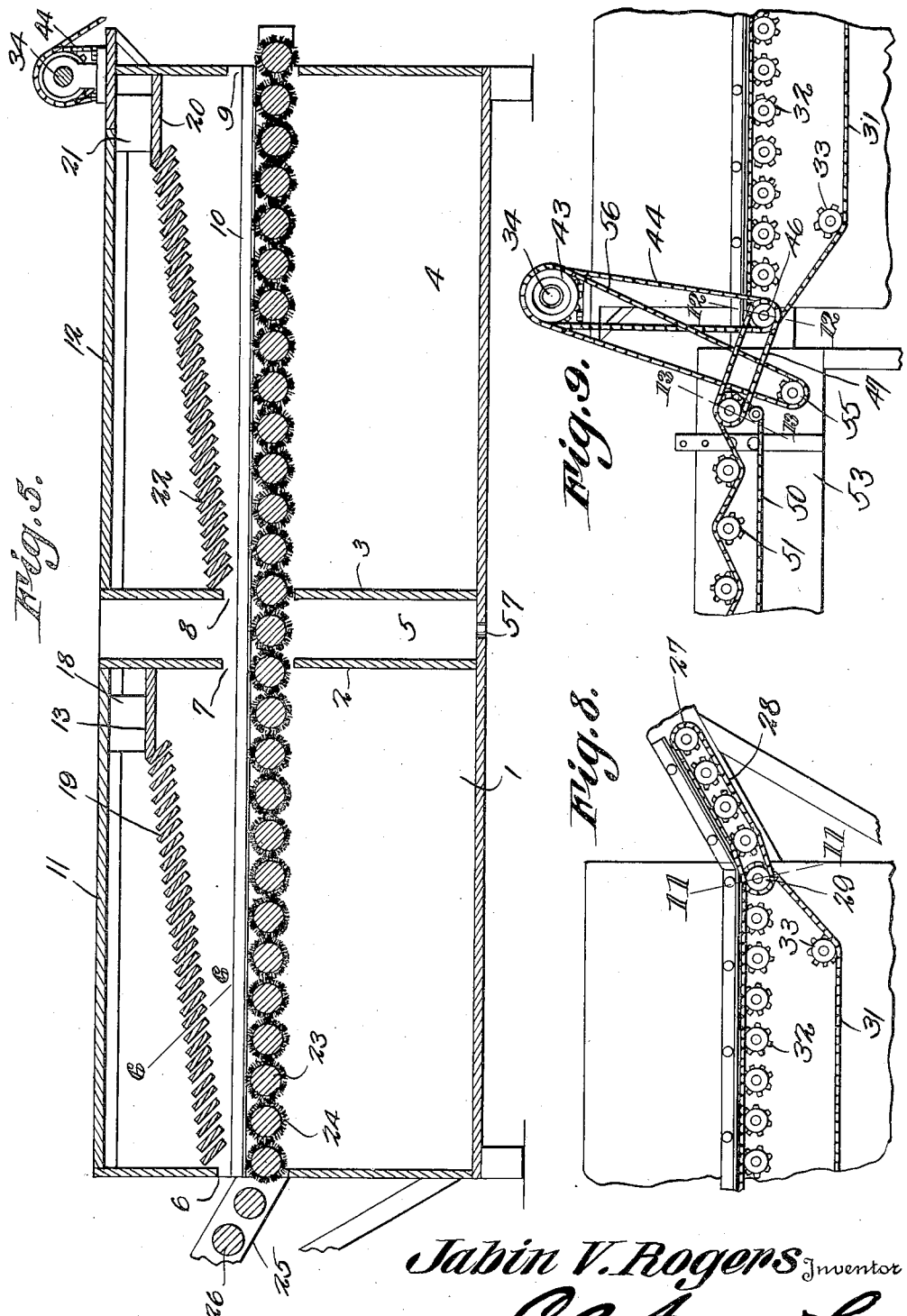
Jabin V. Rogers, Inventor
By C. A. Snow & Co.
Attorneys.

Patented Dec. 4, 1934

1,983,403

UNITED STATES PATENT OFFICE 1,983,403

METHOD AND APPARATUS FOR TREATING FRUITS AND VEGETABLES

Jabin V. Rogers, Wenatchee, Wash., assignor to Food Machinery Corporation, San Jose, Calif., a corporation of Delaware Application February 23, 1928, Serial No. 256,328
Renewed March 12, 1931

16 Claims. (Cl. 146—202)

This invention relates to a method and apparatus for treating fruit or vegetables, and is particularly adapted for the treatment of fruit for the removal of spray residue accumulated on the fruit during the growing season, such as, for example, arsenate of lead compounds.

It is well known that in order to raise a high grade of fruit, spraying methods must be practiced to protect the fruit while growing from the ravages of insect or fungus pests, various spray materials being in common use for the purpose, an example of which is arsenate of lead as mentioned above. It has also been found that the spray must be applied at frequent intervals during the growing period and that such frequent applications of spray material causes the fruit to accumulate successive layers of spray material which adheres very tenaciously and is very hard to remove to meet the minimum requirements fixed by law.

The difficulties encountered in removing the spray residue are frequently increased by the use of oils mixed with the spray material, and frequently oils or oleaginous compounds are separately applied to the fruit during the growing period, so that the resulting coating on the fruit is more or less water repellant. Moreover some fruits, apples in particular, develop a natural waxy coating as they approach maturity, and this natural wax is not only water repellant but as it exudes from the skins it enfolds much of the spray residue thereby making it difficult to reach by ordinary washing methods.

As is well known, the removal of the spray residue is best accomplished by application to the fruit of a suitable chemical washing solution, both acids and alkalis being in common use for the purpose. Hydrochloric acid may be mentioned as an example of a commonly used washing solution. It has been found however, that effective removal of the residue by treating the fruit in accordance with previously known methods, frequently requires heating the washing solution to such temperatures, or the use of such strong solutions, or such lengthy periods of treatment, as to injure the fruit or seriously affect its keeping qualities, and it is a principal object of the present invention to provide a method of washing fruit by which the spray residue may be rapidly and effectively removed without requiring the use of excessively strong or excessively hot solutions.

More specifically it may be stated that in brief, the invention broadly comprehends a method of removing spray residue from fruit by vigorously scrubbing the fruit while continuously rolling it about to expose various surfaces thereof, while simultaneously applying spray dissolving liquid to the fruit in large quantities so as to envelop the pieces of fruit and flow thereover and downwardly therebetween so that the fruit is enveloped in a rapidly flowing stream of washing solution during the scrubbing treatment.

It is also an object of the invention to provide a suitable apparatus for practicing the method described, in which novel means is provided for applying the washing solution to the fruit.

A further object is to provide a fruit washing apparatus in which the fruit is passed successively through washing and rinsing sections and in which carryover of washing liquid from the washing section to the rinsing section is reduced to a minimum, thereby minimizing loss of washing liquid as well as contamination of the rinse liquid.

With such objects and advantages in view, as well as others not specifically enumerated but will hereinafter become apparent, the invention will best be understood by reference to the following detailed description and the accompanying drawings, it being understood that various changes, modifications and variations from the specific embodiment disclosed may be resorted to without departing from the scope and spirit of the invention as defined in the claims appended hereto, and that in order to make the invention more clearly understood, there are shown in the accompanying drawings, somewhat diagrammatically, means and mechanism for placing the same in concrete form, but without limiting the improvements in their application to the particular construction shown.

In the accompanying drawings the preferred form of the invention has been shown.

In said drawings,

Figure 1 is a side elevation of the complete machine with which is combined a drying mechanism.

Figure 2 is a top plan view, parts being broken away.

Figure 3 is an enlarged section on line 3—3, Figure 2.

Figure 4 is an enlarged section on line 4—4, Figure 2.

Figure 5 is an enlarged section on line 5—5, Figure 2.

Figure 6 is a section through one side portion of the acid solution tank, said section being taken on line 6—6, Figure 5.

Figure 7 is an enlarged section on line 7—7, Figure 1, only one side portion of the drying mechanism being shown.

Figure 8 is an elevation of one side portion of the machine at the feed end.

Figure 9 is an elevation of said side portion at the delivering end.

Figure 10 is a plan view of parts of two brushes.

Figure 11 is a section on line 11—11, Figure 8.

Figure 12 is a section on line 12—12, Figure 9.

Figure 13 is a section on line 13—13, Figure 9.

Referring to the figures by characters of reference 1 designates an acid solution tank separated by partitions 2 and 3 from a water tank 4. A drain compartment 5 is provided between the partitions and extends throughout the width of the tanks. The acid solution tank has an inlet opening 6 in one end and an outlet opening 7 in the partition 2 at the other end. The water tank 4 has an inlet opening 8 in the partition 3 and an outlet opening 9 at its other end. All of these openings aline, and extending through the openings and longitudinally of the tanks are downwardly and inwardly inclined deflecting strips 10 secured to the respective sides of the tanks.

The upper portion of the tank 1 is closed at the top so as to provide a hood 11 over the tank and another similar hood 12 is provided over the tank 4.

Extending transversely of the hood 11 in the upper portion thereof and above outlet 7 is a trough 13 having an inlet 14 at one side adapted to receive acid solution from a pipe 15 which extends from a pump 16 located at one side of the tank 1. This pump is supplied with acid solution through a pipe 17 leading from the bottom of tank 1. For the purpose of effecting delivery of the acid solution from the trough 13 throughout the width of the tank, baffles 18 in the form of partitions can be arranged on the bottom of the trough so that when acid solution is delivered to the trough portions thereof will be delivered from the trough between the sides of the hood 11 and the baffles and between the baffles.

Extending downwardly and rearwardly from the outlet edge of the trough 13 is a distributor made up of closely arranged parallel spill boards 19, these boards being arranged in a straight series inclined downwardly from the delivery edge of the trough 13 to the upper portion of the inlet 6. All of the spill boards are also inclined so as to be disposed in lapped relation, this arrangement being clearly indicated in Figure 5.

In the upper portion of the hood 12 above the outlet 9 is another distributing trough 20 similar to the trough 13 and having baffles 21 or the like. Inclined downwardly from this trough to the upper portion of the inlet 8 is a spillway made up of closely arranged inclined lapping boards extending throughout the width of the hood and corresponding with the boards 19.

Extending longitudinally of the two tanks and across the drain compartment 5 is a series of rotatable brushes extending transversely of the apparatus and journalled in the sides thereof. Each of these brushes includes a core 23 having tufts of bristles 24 extending therefrom, these bristles being formed preferably of horse hair or any other suitable material. The tufts of bristles on the cores are staggered so that when the brushes rotate in unison as hereinafter explained they will not interfere with each other but will work between each other as shown, for example, in Figure 10.

Leading downwardly to the inlet 6 are the side strips 25 of the feeding means, there being parallel rollers 26 journalled in these strips and spaced apart as shown. These rollers have sprockets 27 at one end all of which are rotated simultaneously in one direction by an endless chain 28 receiving motion from a sprocket 29 rotatable with one of the brushes in the acid tank. Another sprocket 30 rotates with said brush and is adapted to drive an endless chain 31 which engages sprockets 32 rotatable with the other brushes in the tanks. Suitably arranged idlers 33 can be employed for guiding this chain.

Journalled on the hood 12 is a drive shaft 34 having a pulley 35 adapted to transmit motion through a belt 36 to a shaft 37 which not only acts to operate the pump 16 but also serves to drive a pump 38 used for withdrawing water through a pipe 39 from the bottom of the water tank 4 and elevating it through a pipe 40 to one end of the distributing trough 20. A motor 41 can be arranged on the hood 12 for driving shaft 34.

Secured to the other end of the shaft 34 are sprockets 42 and 43. The sprocket 42 is used for transmitting motion through a chain 44 to a sprocket 45 carried by one of the brushes in the tank 4. Another sprocket 46 rotates with said brush and transmits motion through a chain 47 to a sprocket 48. Another sprocket 49 rotates with the sprocket 48 and transmits motion through an endless chain 50 to a plurality of sprockets 51, this chain being threaded between the sprockets so that each sprocket will rotate oppositely to the adjoining sprockets. All of the sprockets 51 rotate with brushes 52 arranged in a series extending longitudinally within the housing 53 of a dryer or wiper. This housing is located close to the outlet 9 where it can receive fruit as it is delivered therefrom. An endless conveyor in the form of a belt including spaced transverse slats 54 is arranged in the housing 53 below the brushes 52 and is adapted to receive the fruit as it is delivered from the outlet 9 so that it will be carried under the oppositely rotating brushes 52. This conveyor has a sprocket 55 rotatable therewith and driven by chain 56 from the sprocket 43.

In practice the tank 4 is filled with water to be used for rinsing purposes while tank 1 is filled with hydrochloric acid solution. The mechanism is then set in motion and the pumps will lift fluids from the tanks into the respective troughs. When acid solution is elevated to the trough 13 it will be spread laterally thereby so as to flow evenly over the spillway made up of the boards 19, cascading therealong and discharging in thin sheets downwardly from the spaces between the boards. Thus the acid solution will be delivered transversely and longitudinally of the tank and cause all portions of the fruit under treatment to be contacted thereby. It will also be observed that the arrangement of the boards 19 forming the spillway is such that the washing solution is discharged onto the fruit therebeneath in large quantities due to the accumulative effect of the multiplicity of thin sheets which spread out somewhat in their descent and deluge the fruit with large volumes of liquid which envelopes the fruit and flows rapidly thereover and downwardly therepast between the rotating brushes and into the tank below. By this action, the fruit is thoroughly flooded with the washing solution which reacts with the spray residue loosened by the action of the brushes and rapidly flushes away the products of reaction so that the fruit is continuously subjected to constantly changing unsaturated solution. Similar action takes place above the tank 4.

The fruit to be treated is deposited on the feeder and will be conveyed downwardly by the driven rollers 26. The spaces between the rollers will allow trash to be delivered downwardly so as not to pass into the apparatus. As the fruit enters the inlet 6 it will be engaged by the rotating brushes and thoroughly agitated thereby. The acid solution will loosen the arsenic lead deposits which will be removed quickly. As the fruit reaches the outlet 7 it will be cleaned of arsenic lead and as it passes across the chamber or compartment 5 surplus acid solution will drain therefrom. It will be noted in passing that this compartment has an outlet 57 through which this surplus acid solution can be removed. The fruit passes from chamber 5 through the inlet 8 where it is subjected to the action of rinse water cascading thereonto and serving to thoroughly rinse the fruit before it leaves the outlet 9. From this outlet the fruit is delivered to the slatted conveyor and carried under the oppositely revolving wiping brushes 52 which operate at high speed and act to dry the fruit before it is delivered from the machine.

It is to be understood that, if desired, the wiping or drying mechanism need not be used as a part of the washing mechanism.

By providing the inclined strips 10 the bearings of the brushes are protected from the acid solution which will drain downwardly away from them.

As the boards of the spillways are inclined downwardly and forwardly the sheets of fluid delivered onto the fruit will not retard the movement of the fruit but, on the contrary, will tend to accelerate it.

What is claimed is:

1. Apparatus of the class described including a tank, a series of transversely disposed revolving brushes extending longitudinally of the tank and constituting fruit agitating and conveying means, an inclined spillway above the brushes including closely arranged, inclined lapping boards providing inclined spaces therebetween for directing inclined sheets of fluid against fruit being treated to facilitate movement of the fruit through the apparatus, and means for withdrawing fluid from the tank and delivering it to the upper portion of the spillway.

2. Apparatus of the class described including a tank having an inlet and an outlet, a series of brushes for conveying fruit or the like from the inlet to the outlet means for simultaneously rotating the brushes at the same speed and in the same direction, said brushes constituting agitating and brushing means, means for feeding material to the brushes through the inlet, a spillway supported in an inclined position above the brushes and including closely arranged inclined lapping boards providing slots therebetween, and means for elevating the liquid from the tank to the spillway for distribution thereby in the form of inclined sheets of liquid upon the material supported by the brushes to scour the material and impel it through the apparatus.

3. Apparatus of the class described including an acid treating tank, a rinsing tank, a draining compartment between the tanks, and a series of parallel brushes extending through the tank and compartment above the liquid contents thereof for conveying along a straight path the material to be treated and for rotating and brushing the material.

4. An apparatus for treating fruit comprising a solution tank, a spillway for distributing solution, a pump for delivering solution from said tank to said spillway, and conveyor elements fixed against longitudinal movement for moving fruit under said spillway, said spillway consisting of a series of spaced overlapping members inclined opposite to the direction of flow of solution thereover so that the solution in passing through the spaces between said spillway members will have its direction of flow reversed thereby producing a uniform and regular distribution of the solution over the entire spillway.

5. An apparatus for treating fruit comprising a solution tank, a spillway for distributing solution, a pump for delivering solution from said tank to said spillway, a conveyor for moving fruit under said spillway, said spillway consisting of a series of members arranged in spaced and overlapping relation and so positioned that a flow of solution over the top surface of said members in a given direction will successively find its way through the spaces between said overlapping members and flow in a reverse direction to pass therethrough and fall on fruit on said conveyor.

6. A uniform distribution spillway for fruit treating machines comprising a series of members arranged in spaced and overlapping relation and inclined relative to the direction of solution flow thereover, means for discharging solution over said spillway whereby as solution flows thereover it will successively find its way through said spaces between said inclined members, have its direction of flow reversed and fall on fruit located thereunder to treat the same, with means for providing a flow of solution and means for moving fruit thereunder.

7. In an apparatus of the class described, a pair of liquid treating sections, a draining section therebetween, and a conveyor for conveying articles successively through said sections, said conveyor comprising a plurality of conveyor elements mounted upon fixed axes, at least one of said conveyor elements being wholly within said draining section with means adjacent said liquid treating sections for distributing flood streams of treating liquid onto said fruit.

8. An apparatus for removing spray residue from the surfaces of fruit comprising a solution tank, a means for moving fruit through a pathway, a spillway located above said moving fruit for releasing and distributing a flood stream of residue removing material, a pump for delivering material from said tank to said spillway in sufficient volume to supply said flood stream for continuous flow, the means for moving said fruit including abraiding means for rubbing said fruit and changing its axes relative to said rubbing means so that all surfaces will be contacted with said residue removing material, with means for then draining and washing said fruit.

9. An apparatus for removing spray residue from the surfaces of fruit comprising a solution tank, means for moving fruit through a predetermined pathway, a spillway located adjacent said moving fruit for releasing and distributing a flood stream of residue removing liquid onto said fruit, means for delivering liquid from said tank to said spillway in sufficient volume to supply a continuously flowing flood stream, fruit abraiding means associated with the fruit moving means for abraiding the fruit and changing its axes in relation to said abraiding means so that all surfaces will be contacted by said liquid, a station along the path of moving fruit for draining liquid from the fruit, and a station along the path of moving fruit for rinsing and washing the treated fruit to remove all traces of spray residue or acid solution, and means for then drying the fruit.

10. An apparatus for removing spray residue from the surfaces of fruit comprising a unitary treating apparatus consisting of a feeding and trash removing section, a spray loosening and removing section, a draining section, a washing section and a drying section, a single conveyor for moving fruit through the spray removing section, the draining and the washing sections, said conveyor comprising a plurality of like elements arranged in parallel relation and adapted to convey fruit transverse to their parallel relation, abraiding means associated with said conveyor, said plurality of conveyor elements being on fixed axes with means for imparting movement to each conveyor element, a liquid spillway located adjacent said moving fruit, means for supplying a liquid to said spillway in sufficient volume to give a continuous flow of liquid thereacross, the elements of said spillway being arranged to give a substantially uniform distribution of liquid over said spillway, abraiding means associated with the conveyor elements for turning said fruit through a plurality of axes so that all surfaces will be contacted with solution from said spillway, the continuous flow of liquid onto said fruit being in continuous flood volume.

11. A method of washing fruit including the steps of moving the fruit through a path and brushing the fruit so moved to thoroughly agitate the fruit and turn the same over and over and while so agitating the fruit dispelling flood volumes of spray residue removing solution downwardly at substantially gravity head onto and through the path of travel of the fruit to envelope the fruit therein to react with the spray residue on the fruit and wash the products of the chemical reaction of spray residue and the chemical from the surface of the fruit to eliminate the formation on any portion of the surface of the fruit of films of solution containing the products of reaction produced between the spray residue and the solution tending to retard the removal of spray residue from the fruit.

12. The method of removing spray residue and other foreign matter from the surfaces of fruit consisting in moving fruit through a longitudinal path, scrubbing and turning the fruit while moving it, rendering soluble and slushing away loosened residue and foreign matter by cascading flood streams of residue removing solution directed downwardly onto and past the fruit, the fruit being continuously subjected to constantly changing unsaturated residue removing solution during the scrubbing.

13. The method of treating fruit to remove chemical spray residue therefrom consisting in moving a distributed quantity of fruit along a predetermined pathway, vigorously scrubbing the spray residue covered fruit to loosen adhering spray residue therefrom while continuously rolling each fruit during its travel to expose various surfaces thereof, discharging spray dissolving liquid at substantially gravity head onto said fruit in flood volume to envelope the pieces of fruit and flow thereover and downwardly therepast so that the fruit is continuously enveloped with a rapidly flowing stream of washing liquid to rapidly dissolve and flush away the spray residue so as to prevent the adherence to the fruit surfaces of films of washing liquid containing the products of reaction produced between the spray residue and the washing liquid tending to retard further removal of spray residue from the fruit, then continuing the movement of the fruit and discharging rinse liquid onto the fruit to remove the spray solvent.

14. The method of treating fresh fruit to remove chemical spray residues from the surfaces thereof, which comprises moving a distributed quantity of spray residue covered fruit along a predetermined pathway while vigorously and continuously brushing the same to loosen adhering spray residue therefrom and continuously rolling each fruit during its travel to expose various surfaces thereof and successively subjecting said fruit to the chemical reaction and flushing action of large volumes of chemical spray dissolving washing liquid in the form of substantially solid cascading sheets, such as to repeatedly envelope the fruit surfaces in substantially solid streams of rapidly flowing washing liquid to dissolve and flush away said spray residue.

15. A fruit treating apparatus including an acid treating section, an acid draining section having walls extending to near the line of moving fruit and a washing or rinsing section placed in successive alignment, a conveyor for moving fruit through said sections and comprising a series of transverse rollers fixed as to location but mounted for axial rotation with means for rotating them, said rollers being spaced so there is no physical contact between them and having flexible peripheral means for engaging and conveying fruit from roller to roller, a series of said spaced rollers in said acid treating section and at least one of said rollers in said draining section, a means above said rollers for delivering acid treating solution in the acid section but stopping short of said draining section, a tank below said rollers for receiving acid solution falling therethough and from said draining section, a means over said rollers in said washing section for delivering a washing medium in said washing section, the fixed location of said rollers and the spacing thereof rendering them incapable of conveying liquid from one section to another.

16. A fruit treating apparatus including an acid treating section, a series of rollers in advance of said acid treating section for agitating and separating debris from the fruit passing thereover, an acid draining section having walls extending to near the line of moving fruit and a washing or rinsing section placed in successive alignment, a conveyor for moving fruit through said sections and comprising a series of transverse rollers fixed as to location but mounted for axial rotation with means for rotating them, said rollers being spaced so there is no physical contact between them and having flexible peripheral means for engaging and conveying fruit from rollers to roller, a series of said spaced rollers in said acid treating section and at least one of said rollers in said draining section, a means above said rollers for delivering acid treating solution in the acid section but stopping short of said draining section, a tank below said rollers for receiving acid solution falling therethrough and from said draining section, a means over said rollers in said washing section for delivering a washing medium in said washing section, the fixed location of said rollers and the spacing thereof rendering them incapable of conveying liquid from one section to another

JABIN V. ROGERS.